United States Patent [19]

Kowalczik et al.

[11] Patent Number: 5,128,422
[45] Date of Patent: Jul. 7, 1992

[54] BLOCK COPOLYMERS BASED ON POLYPHENYLENE ETHERS AND POLYCONDENSATES, AND PROCESS FOR PRODUCING THEM

[75] Inventors: Udo Kowalczik, Bochum; Martin Bartmann, Recklinghausen; Heinz G. Poll, Marl, all of Fed. Rep. of Germany

[73] Assignee: Huels Aktiengesellschaft, Marl, Fed. Rep. of Germany

[21] Appl. No.: 477,457

[22] Filed: Feb. 9, 1990

[30] Foreign Application Priority Data

Apr. 4, 1989 [DE] Fed. Rep. of Germany ....... 3910832

[51] Int. Cl.⁵ .................. C08G 65/48; C08L 67/00; C08L 71/12; C08L 77/00
[52] U.S. Cl. .................... 525/397; 526/212; 526/215
[58] Field of Search ............. 525/397; 526/212, 215

[56] References Cited

FOREIGN PATENT DOCUMENTS 338209 10/1989 European Pat. Off. .
1520019 7/1969 Fed. Rep. of Germany .

*Primary Examiner*—Jacob Ziegler
*Attorney, Agent, or Firm*—Oblon, Spivak, McClelland, Maier & Neustadt

[57] ABSTRACT

Block copolymers based on polyphenylene ethers and polycondensates obtained by a process that comprises of the following steps:

a polyphenylene ether with a functional end group is prepared by oxidative coupling of a mixture of 90.0 to 99.8 mole % of a substituted phenol and 10.0 to 0.2 mole % of a functionalized phenol;

a polycondensation of suitable monomers is then carried out in the presence of this functionalized polyphenylene ether, are disclosed.

17 Claims, No Drawings

BLOCK COPOLYMERS BASED ON POLYPHENYLENE ETHERS AND POLYCONDENSATES, AND PROCESS FOR PRODUCING THEM

BACKGROUND OF THE INVENTION

1. Field of the Invention

This invention relates to polyphenylene ether·polycondensate block copolymers and to their preparation from substituted phenols and polycondensable monomers.

2. Discussion of the Background

Polyphenylene ether-polycondensate block copolymers are known in principle. DE-OS 15 20 019 describes the preparation of block copolymers from (i) polyphenylene ethers that have phenolic hydroxyl groups at both ends and (ii) polycondensates, such as polyesters or polyamides.

Thus, for example, a polyphenylene ether-polyester block copolymer can be prepared by esterifying a difunctional polyphenylene ether and 1,6-hexanediol with adipoyl dichloride in dry pyridine. Drawbacks of this method are the low reactivity of the phenolic end groups, the use of acid chlorides, and the use of pyridine.

Molding compositions that contain polyphenylene ether-polyester block or graft copolymers of the general formula A—$Z^1$—B and processes for preparing them are described in EP-OS 0 248 263. Variable A in this formula is a polyphenylene ether block and variable B is a polyester block. Variable $Z^1$ is a linking group that is derived from a number of difunctional or polyfunctional compounds such as trimellitic anhydride monochloride, terephthaloyl dichloride, maleic acid derivatives, hexamethylenediisocyanate, 1,4-bis(2-oxazolinyl)benzene, or glycidyl methacrylate.

The starting material in this case is a preformed, initially unfunctionalized polyphenylene ether, and the linking is accomplished by reaction at the phenolic end groups (for example esterification with acid chlorides), on the aromatic rings (electrophilic substitution with N-methylolacetamide and methanesulfonic acid, Example 2), or on the alkyl groups (radical attack with glycidyl methacrylate, Examples 5-9).

The drawbacks in this technology are:

(i) the low reactivity of the sterically hindered phenolic end group; the average grafting yield based on the polyphenylene ether is only about 30%;

(ii) the nonspecific nature of the reaction in the attack on the aromatic rings or alkyl groups; the number of linking groups $Z^1$ introduced and the position of substitution cannot be determined in advance; and (iii) the formation of a large proportion of homopolymer in the radical attack of polymerizable functional compounds, such as glycidyl methacrylate; these homopolymers then have to be separated in a laborious manner.

A special case of polyphenylene ether-polycondensate block copolymers is described in EP-OS 0 193 741. This polycondensate, preferably a polyester, has liquid crystalline character. Starting from preformed polyphenylene ethers, the linkage takes place on the phenolic end groups in this case also, for example by reaction with acid chlorides.

Polyphenylene ether-polyamide block copolymers are prepared by reacting the phenolic end groups of preformed, unfunctionalized polyphenylene ethers with difunctional or polyfunctional coupling reagents that act as promoters for the subsequent polymerization of added lactam (EP-OS 0 211 201; *Polym. Bull.* (1987) 17 423). The low reactivity of the phenolic end groups, which requires the use of a large excess of promoter or industrially uncommon reagents such as sodium hydride, is a drawback here also. Further, the products contain only 10 to 46 wt. % block copolymer. This method is also limited to block copolymers whose polyamide segments are derived from lactams.

Polyphenylene ether-polyester graft copolymers in which a polyphenylene ether main chain is grafted with polypivalolactone chains in statistical distribution are described in EP-OS 0 243 271. The process requires the metallation of the polyphenylene ether, dissolved in tetrahydrofuran, with organometallic compounds such as n-butyllithium with rigorous exclusion of atmospheric oxygen, moisture, and residual solvents that contain easily abstractable hydrogen, such as alcohols.

The polyphenylene ether-polycondensate block copolymers and graft copolymers known from the state of the art are therefore available only by a laborious synthesis that comprises three separate steps:

1. preparation of a conventional unfunctionalized polyphenylene ether;
2. functionalization;
3. polycondensation of suitable monomers in the presence of this functionalized polyphenylene ether.

Alternatively, the following path, likewise comprising three steps, can be taken (for example, see EP-OS 0 248 263):

1. preparation of a conventional unfunctionalized polyphenylene ether;
1*. its functionalization as the case requires;
2. preparation of a polyester;
2*. its functionalization as the case requires;
3. coupling of polyphenylene ether and polyester by reaction in solution or in the melt.

In the normal case a mixture is formed that contains large fractions of the corresponding homopolymers. Furthermore, the synthesis is frequently limited to a specific polycondensate.

SUMMARY OF THE INVENTION

Accordingly it is an object of this invention to provide a synthesis for polyphenylene ether-polycondensate block copolymers, which avoids the drawbacks mentioned above.

A simpler process for the preparation of such block copolymers has now been found. This comprises only two reaction steps, with a product being obtained in which most of the polyphenylene ether fraction, frequently even more than 90 wt. %, is bonded to the polycondensate. Furthermore, these block copolymers differ in structure from those disclosed by the literature (see below).

These block copolymers can be used by themselves or as an additive in thermoplastic molding compositions.

DETAILED DESCRIPTION OF THE PREFERRED EMBODIMENTS

The process of the present invention comprise the following steps.

(1) A polyphenylene ether is first prepared from a suitable mixture of monomers by oxidative coupling. This polyphenylene ether has a phenolic end group at one end of the chain in the usual way, and a functional group at the other end of the chain.

(2) This functionalized polyphenylene ether is then reacted with a polycondensate-forming mixture of monomers.

In step (1) above, phenols of the formulae

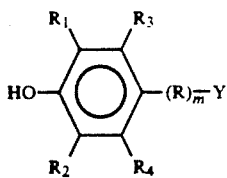   (I)

and

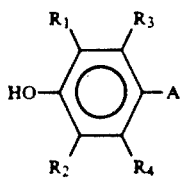   (II)

are used together as monomers for the oxidative coupling to form polyphenylene ethers that have a functional group at the end of the polymer chain.

In the above formulae:

$R_1$ and $R_2$ are each, independently, an optionally substituted $C_{7-12}$-benzyl group, hydrogen or preferably a $C_{1-6}$-alkyl group, with the proviso that $R_1$ and $R_2$ are not both simultaneously tertiary alkyl groups or hydrogen atoms;

$R_3$ and $R_4$ are each, independently, a $C_{1-6}$-alkyl or preferably hydrogen;

R is a divalent lower alkylene, $C_{4-20}$ (cyclo)alkylene arylene, or $C_{7-20}$ benzylic group;

m is 0 or 1;

Y is a functional group that can take part in a polycondensate-forming reaction.

Preferably Y is a group (i) COOR'; or (ii) CONR"R"', with R, R" and R"' each independently being hydrogen, $C_{1-6}$-alkyl or -hydroxyalkyl; or (iii) 2-oxazolinyl; or (iv) $NH_2$; or (v) OH;

wherein variable m can have only the value of 1 in the last two cases (i.e., (iv) and (v));

A is Cl, Br, I, or preferably hydrogen.

Naturally, the substituents $R_1$ to $R_4$ in phenols (I) and (II) can be selected independently of one another. But it is especially preferred for $R_1$ and $R_2$ to be methyl groups, and for $R_3$ and $R_4$ to be hydrogen atoms.

The functionalized phenols of Formula (I) can be prepared by the following illustrative methods.

1. Carboxylation of the sodium or potassium salt of an o,o'-dialkylphenol (W. H. Meck et al., Journal of Chemical and Engineering Data, 14, 388-391 (1969). The carboxylic acid formed can be converted by standard reactions into esters, amides, or oxazolines.

2. Treatment of an o,o'-dialkylphenol alkylcarboxylic acid ester, such as for example 2,6-dimethylphenyl acetate, with aluminum trichloride (H. Henecka in "Methoden der organischen Chemie", (Houben-Weyl), Volume 7/2a, pp. 379 ff., Thieme-Verlag, Stuttgart 1973). The p-acyl- o,o'-dialkylphenol formed can then be converted with sulfur and an amine by the Willgeroth-Kindler method, through a carboxylic acid intermediate, into the corresponding esters, amides, etc.

3. Reaction of a phenol under acid or alkaline catalysis with a substance that has both a C—C double bond or a group that splits off easily to form a carbonium ion, and a functional group such as COOH, an ester, an amide, a nitrile, or the like.

The following are suitable here.

(3.a) Acrylic acids or their derivatives, for example cinnamic acid, ethyl cinnamate, ethyl isopropylidenecyanoacrylate, diethyl benzylidenemalonate, or acrylonitrile.

(3.b) Diels-Alder adducts from optionally substituted butadienes and alkylenecarboxylic acid (derivatives). Such functionalized phenols are described, for example, in EP-OS 0 106 799. Examples of suitable Diels-Alder adducts are those from butadiene and ethyl acrylate, cyclopentadiene and acrylic acid, and isoprene and acrylonitrile.

(3.c) Hydroxycarboxylic acids, such as mandelic acid, for example.

4. The phenolamines and phenolalcohols used can be made by known methods as follows.

(4.a) Reduction of the corresponding carboxylic esters, preferably catalytically, provides the phenolalcohols.

(4.b) The phenolamines are synthesized analogously by reduction of the corresponding amides, nitriles, or nitro compounds (for example from aldehyde and nitromethane).

The type of functionalized phenol and its method of preparation are not critical in this invention within the scope of the formulas indicated. It is essential only for the functional group to be able to react under polycondensation conditions and for the phenolic group to be able to react under the conditions of oxidative coupling.

Preferably the following functionalized phenols are used:

(1). 4-Hydroxy-3,5-dimethylbenzoic acid or its derivatives (according to Method 1 from 2,6-dimethylphenol and carbon dioxide)

(2). (4-Hydroxy-3,5-dimethylphenyl)acetic acid or its derivatives (according to Method 2)

(3). 3-(4-Hydroxy-3,5-dimethylphenyl)propionic acid or its derivatives (according to Method 3a)

(4). (4-Hydroxy-3,5-dimethylphenyl)phenylacetic acid or its derivatives (according to Method 3c)

(5). 3-(4-Hydroxy-3,5-dimethylphenyl)-3-phenylpropionic acid or its derivatives (according to Method 3a from 2,6-dimethylphenol and cinnamic acid)

(6). 2,6-Dimethyl-4-(2-hydroxyethyl)phenol (according to Method 4a by reduction of 4-hydroxy-3,5-dimethylphenylacetic acid esters)

(7). 2,6-Dimethyl-4-(2-aminoethyl)phenol (according to Method 4b by reduction, for example, of 4-hydroxy-3,5- dimethylphenylacetonitrile)

(8). 2-(4-Hydroxy-3,5-dimethylphenyl)-2-oxazoline (according to Method 1)

Examples of suitable substituted phenols of formula (II) are 2,3,6-trimethylphenol, 2,6-dibenzylphenol, 4-bromo-2,6-dimethylphenol, or preferably 2,6-dimethylphenol. Mixtures of such phenols can also be used.

Usually, the oxidative coupling is carried out with a mixture of 0.2 to 10 mole % of phenols of the general formula (I) and 90 to 99.8 mole % of phenols of the general formula (II).

The oxidative coupling reaction is carried out pursuant to the state of the art, in aromatic solvents such as chlorobenzene, 1,2-dichlorobenzene, xylene, toluene, benzene, ethylbenzene, pyridine, or in mixtures of these solvents with alcohols such as methanol or isopropanol or ketones such as acetone or hydrocarbons such as hexane or heptane. The reaction takes place in the presence of a metal catalyst and a case such as a secondary and/or tertiary amine while passing a gas containing oxygen through the mixture.

Copper-amine complexes and manganese complexes are usually used as catalysts (see U.S. Pat. Nos. 3,306,874, 3,306,875; EP-OS 0 098 929, 0 099 965, 0 122 394, 0 137 139, and DE-OS 34 42 141 and 25 05 328). The choice of catalyst system is not critical. After reaching the desired molecular weight, the reaction is terminated by methods described in the literature and the polymer is isolated in the usual way.

Suitable functionalized polyphenylene ethers and their preparation are described in German Patent Application O(-OS 38 13 355 and in DE-OS 17 45 201 (=U.S. Pat. No. 3,440,217), to which reference is hereby made.

In the next step the functionalized polyphenylene ethers are reacted with a polycondensate-forming mixture of monomers.

Polycondensates suitable as a constituent of the block copolymers contain the following general structural units:

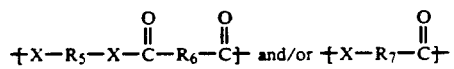

wherein:

X is O or NH;

$R_5$ is a divalent $C_{2-22}$ aliphatic or $C_{6-22}$ aromatic group or a moiety having a structure of the general formula

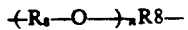

in which $R_8$ is a divalent $C_{2-4}$ aliphatic group and n has a value between 1 and 60;

$R_6$ is a divalent $C_{4-38}$ aliphatic or $C_{6-38}$ aromatic group;

$R_7$ is a divalent $C_{1-20}$ aliphatic or $C_{6-20}$ aromatic group.

Typical examples of suitable polycondensates are polyamides, polyamidimides, polyesters, polyesteramides, polyetheresteramides, polyetheramides, and polyetheresters.

The following monomers can be used to prepare these polycondensates:

(i) Aliphatic or aromatic dicarboxylic acids with 6 to 40 carbon atoms or their derivatives, for example such as adipic acid, trimethyladipic acid, suberic acid, azelaic acid, sebacic acid, dodecanedioic acid, dimeric fatty acid (preferably hydrogenated), isophthalic acid and terephthalic acid and their esters.

(ii) $C_{6-12}$ aliphatic or $C_{6-12}$ aromatic tricarboxylic acids or their anhydrides or esters. These tricarboxylic acids must be able to form cyclic imides, i.e., two carboxyl groups have to be in the ortho or alpha,beta positions or alpha,gamma positions. Suitable examples of this are succinylacetic acid and trimellitic anhydride.

(iii) $C_{2-22}$ aliphatic or $C_{6-22}$ aromatic diamines, such as ethylenediamine, hexamethylenediamine, trimethylhexamethylenediamine, isophoronediamine, dodecamethylenediamine, bis(p-aminocyclohexyl)methane, m-xylylenediamine, and 2,4-diaminotoluene.

(iii) $C_{2-22}$ aliphatic or $C_{6-22}$ aliphatic/aromatic aminoalcohols, such as ethanolamine, 1-amino-2-propanol, or 2-amino-1-phenylethanol.

(v) $C_{2-22}$ aliphatic diols, such as ethylene glycol, 1,4-butanediol, neopentyl glycol, 1,4-cyclohexanedimethanol, 1,6-hexanediol, 1,10-decanediol, and 1,12-dodecanediol.

(vi) polyether diols and polyetherdiamines of the formula

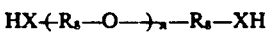

wherein X is O or NH, and $R_8$ is a divalent $C_{2-4}$ aliphatic group, and n has a value of between 1 and 60. Examples are polyethylene glycol, polypropylene glycol, polytetrahydrofurandiol, and polytetrahydrofurandiamine. Polytetrafurandiol with a molecular weight $\overline{Mn}$ between 500 and 4000 (PTHF 500 to 4000) is preferably used.

(vii) lactams and aminocarboxylic acids with 2 to 21 carbon atoms such as glycine, caprolactam, omega-aminocaproic acid, omega-aminoundecanoic acid, omega-minododecanoic acid, laurolactam, or 3-aminobenzoic acid. (viii) lactones and hydroxycarboxylic acids with to 21 carbon atoms such as glycolic acid, lactic acid, 4-hydroxybutyric acid, pivalolactone, or caprolactone.

The preparation of polyamides is described, for example, in Kirk-Othmer, Encyclopedia of Chemical Technology, Vol. 18, John Wiley & Sons 1982, pp. 328-371, and the preparation of polyesters ibid., pp. 549-574. Suitable polyamidimides are prepared by the processes customary for polyamides. Polyesteramides are obtained by the usual procedures for polyamides or polyesters. Concerning the preparation of polyetheresteramides and polyetheramides, for example, refer to Elias/Vohwinkel, "New Polymeric Materials for Industrial Use", Series 2, Hanser, Munich 1983, pp. 125-134, and the literature cited therein; concerning polyetheresters, refer to ibid., pp. 121-124.

The block copolymers pursuant to the invention are synthesized by polycondensation of the monomers mentioned above in the presence of the polyphenylene ethers containing end groups. This polycondensation can be carried out in solution or preferably in the melt. The polycondensate blocks have molecular weights in the range of $\overline{Mn}=1000$ to 50,000, preferably 1,500 to 20,000. The molecular weight is generally adjusted, at least in part, by the polyphenylene ether containing end groups, and in addition by a regulating excess of one of the difunctional polycondensate-forming monomers.

In a less preferred embodiment, a monofunctional regulator such as stearylamine or benzoic acid is also used. The polyphenylene ethers containing end groups have molecular weights $\overline{Mn}$ of about 1,200 to 60,000. The value of $\overline{Mn}$ is determined by the proportion of functionalized phenol used.

The polyphenylene ether-polycondensate block copolymers pursuant to the invention are therefore distinguished from the state of the art by
very extensive linking of the polyphenylene ether;
a novel linking principle (bonding not at the head but at the tail of the polyphenylene ether chain);
termination of the polyphenylene ether blocks by phenolic end groups.

The block copolymers pursuant to the invention can be used directly or as an additive for molding compositions to produce, for example, plastic molded objects or films.

The viscosity number J of the block copolymers pursuant to the invention is determined according to DIN 53 728 in chloroform in cm³/g (concentration: 5 g/l).

Having generally described this invention, a further understanding can be obtained by reference to certain specific examples which are provided herein for purposes of illustration only and are not intended to be limiting unless otherwise specified.

EXAMPLES

Polyphenylene ethers (PPE) with the following functional end groups were used to prepare the block copolymers.

|  | Prepared from [mole-%] | |
|---|---|---|
|  | 2,6-Dimethyl-phenol | functionalized phenol |
| PPE~O—⟨○⟩—CH(Ph)—COOC₂H₅ <br> A J = 11 cm³/g <br> B J = 39 cm³/g | 92 <br> 99 | 8 <br> 1 |
| PPE~O—⟨○⟩—CH₂—COOCH₃ <br> C J = 17 cm³/g | 96 | 4 |
| PPE~O—⟨○⟩—CH₂—CH₂—OH <br> D J = 33 cm³/g | 99 | 1 |
| PPE~O—⟨○⟩—CH₂—CH₂—NH₂ <br> E J = 21 cm³/g | 98 | 2 |

Example 1.1

32.3 g PPE A, 11.4 g dodecanedioic acid and 63 g PTHF 1000 are heated under nitrogen together with 15 g butanediol and 0.3 g titanium tetraisopropanolate solution (10 wt. % in isopropanol) to 220° to 240° C. over a period of 3 hours. The polycondensation is carried out at 240° C. under oil pump vacuum over a period of 4 hours.

For purification, the product is dissolved in hot toluene, precipitated with methanol, and then extracted with hot isopropanol. It is dried at 100° C. under oil pump vacuum.

J = 30 cm³/g.

GPC studies show that the distribution is monomodal.

Example 1.2

Similarly to Example 1.1, a mixture of 51 g PPE B, 2.6 g terephthalic acid, 9 g 1,4-butanediol, and 0.1 g of 10% titanium isopropanolate solution is heated. The polycondensation is carried out under oil pump vacuum for 2 hours from an initial temperature of 250° C. with slow heating to 270° C.

J = 47 cm³/g (not soluble to a clear solution).

Example 1.3

46 g PPE C, 25.0 g Empol® 1010 (dimeric fatty acid from USI Chemical B.V. Co., Breda, Netherlands), 6.2 g hexamethylenediamine, and 0.2 g of 85% phosphoric acid are heated under nitrogen at 200° C. The temperature is raised to 270° C. over a period of 3 hours, oil pump vacuum is applied, and the polycondensation is terminated after an additional 4 hours.

J = 31 cm³/g

Example 1.4

Analogously to Example 1.1, a mixture of 61.5 g PPE D, 9.4 g dodecanedioic acid, 23.6 g PTHF 650, 25 g butanediol, and 0.2 g of 10% titanium tetraisopropanolate solution is polycondensed. The total polycondensation time is 9 hours.

J = 43 cm³/g.

Example 1.5

Analogously to Example 1.3, a mixture of 73.4 g PPE E, 14.5 g adipic acid, 16.9 g isophoronediamine, 5.3 g stearylamine, and 0.2 g of 85% phosphoric acid as catalyst is polycondensed for 8 hours.

J = 24 cm³/g.

A trimodal distribution can be found in the GPC spectrum that indicates the presence of the following species:

(1) small amounts of low molecular weight polyamide homopolymer;

(2) diblock PPE-polyamide as the main product;

(3) high molecular weight fraction that can be assigned the structure of a PPE-polyamide-PPE triblock copolymer.

Very extensive formation of block copolymers is apparent from the solubility behavior, the buildup of the value of J, and the GPC studies in all cases.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A polyphenylene ether-polycondensate block copolymer, obtained by a process comprising:
   (a) preparing a functionalized polyphenylene ether by oxidatively coupling a monomer mixture of (a) 0.2 to 10 mole % of at least one phenol of formula (I) and (b) 99.8 to 90.0 mole % of at least one phenol of formula (II), wherein formulae (I) and (II) are:

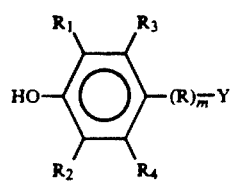

I and

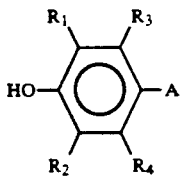

wherein:

$R_1$ and $R_2$ each, independently, selected from the group consisting of benzyl, lower alkyl mono-substituted benzyl, lower alkyl di-substituted benzyl, hydrogen, and $C_{1-6}$-alkyl with the proviso that $R_1$ and $R_2$ are not both, simultaneously, tertiary alkyl group or halogen:

$R_3$ and $R_4$ each, independently, selected from the group consisting of $C_{1-6}$-alkyl and hydrogen;

R is selected from the group consisting of divalent $C_{1-2}$ alkylene, $C_{4-20}$ (cyclo)alkylene, $C_{6-20}$ arylene, and $C_{7-20}$ benzylic group;

m is 0 or 1;

Y is a functional group which takes part in a polycondensate-forming reaction;

A is selected from the group consisting of Cl, Br, I, and hydrogen; and (B) polycondensating at least one suitable monomer in the presence of said functionalized polyphenylene ether to produce a polycondensate that contains units of the formula:

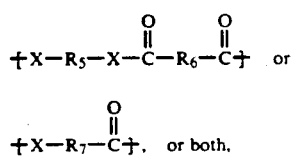

wherein:

X is selected from the group consisting of O and NH;

$R_5$ is selected from the group consisting of divalent, $C_{2-22}$ aliphatic, $C_{6-22}$ aromatic group and a moiety of formula:

wherein:

$R_8$ is a divalent $C_{2-4}$ aliphatic group and n has a value between 1 and 60;

$R_6$ is selected from the group consisting of divalent $C_{4-38}$ aliphatic and $C_{6-38}$ aromatic groups; and $R_7$ is selected from the group consisting of divalent $C_{1-20}$ aliphatic and $C_{6-20}$ aromatic.

2. The copolymer of claim 1, wherein Y is selected from the group consisting of COOR', CONR"R'" and 2-oxazolinyl, wherein R', R" and R'" are each, independently, selected from the group consisting of hydrogen, $C_{1-6}$-alkyl and $C_{1-6}$-hydroxyalkyl.

3. The copolymer of claim 1, wherein m is 1 and Y is OH or $NH_2$.

4. The copolymer of claim 1, wherein $R_1$ and $R_2$ are both methyl, and $R_3$ and $R_4$ are both hydrogen.

5. The copolymer of claim 1, wherein said polycondensate is a polyester.

6. The copolymer of claim 1, wherein said polycondensate is a polyamide.

7. The copolymer of claim 1, wherein polycondensate blocks have a molecular weight $\overline{Mn}$ of 1,000 to 50,000.

8. The copolymer of claim 7, wherein $\overline{Mn}$ is 1,500 to 20,000.

9. A molding composition which contains a block copolymer of claim 1.

10. A process for obtaining a polyphenylene ether-polycondensate block copolymer, obtained by a process comprising:

(a) preparing a functionalized polyphenylene ether by oxidatively coupling a monomer mixture of (a) 0.2 to 10 mole % of at least one phenol of formula (I) and (b) 99.8 to 90.0 mole % of at least one phenol of formula (II), wherein formulae (I) and (II) are:

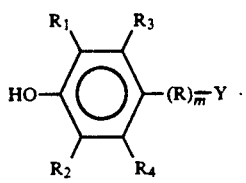

and

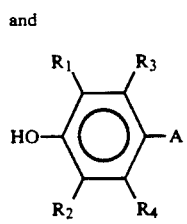

wherein $R_1$ and $R_2$ each, independently, selected from the group consisting of benzyl, lower alkyl mono-substituted benzyl, lower alkyl di-substituted benzyl, hydrogen, and $C_{1-6}$-alkyl with the proviso that $R_1$ and $R_2$ are not both, simultaneously, tertiary alkyl group or halogen:

$R_3$ and $R_4$ each, independently, selected from the group consisting of $C_{1-6}$-alkyl and hydrogen;

R is selected from the group consisting of divalent $C_{1-2}$ alkylene, $C_{4-20}$ (cyclo)alkylene, $C_{6-20}$ arylene, and $C_{7-20}$ benzylic group;

m is 0 or 1;

Y is a functional group which takes part in a polycondensate-forming reaction;

A is selected from the group consisting of Cl, Br, I, and hydrogen; and (B) polycondensating at least one suitable monomer in the presence of said functionalized polyphenylene ether to produce a polycondensate that contains units of the formula:

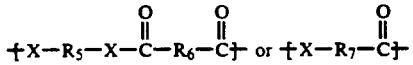

wherein:

X is selected from the group consisting of O and NH;

$R_5$ is selected from the group consisting of divalent, $C_{2-22}$ aliphatic, $C_{6-22}$ aromatic group and a moiety of formula:

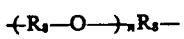

wherein:

$R_8$ is a divalent $C_{2-4}$ aliphatic group and n has a value between 1 and 60;

$R_6$ is selected from the group consisting of divalent $C_{4-38}$ aliphatic and $C_{6-38}$ aromatic groups; and $R_7$ is selected from the group consisting of divalent $C_{1-20}$ aliphatic and $C_{6-20}$ aromatic.

11. The process of claim 10, wherein Y is selected from the group consisting of COOR', CONR"R"' and 2-oxazolinyl, wherein R', R" and R"' are each, independently, selected from the group consisting of hydrogen, $C_{1-6}$-alkyl and $C_{1-6}$-hydroxyalkyl.

12. The process of claim 10, wherein m is 1 and Y is OH or $NH_2$.

13. The process of claim 10, wherein $R_1$ and $R_2$ are both methyl, and $R_3$ and $R_4$ are both hydrogen.

14. The process of claim 10, wherein said polycondensate is a polyester.

15. The process of claim 10, wherein said polycondensate is a polyamide.

16. The process of claim 10, wherein polycondensate blocks have a molecular weight $\overline{Mn}$ of 1,000 to 50,000.

17. The process of claim 10, wherein $\overline{Mn}$ is 1,500 to 20,000.

* * * * *